United States Patent [19]

Trunnell

[11] 4,099,788
[45] Jul. 11, 1978

[54] CURVED METAL CLAMP PLATE

[76] Inventor: Harold K. Trunnell, P.O. Box 2336, Eugene, Oreg. 97402

[21] Appl. No.: 697,678

[22] Filed: Jun. 18, 1976

[51] Int. Cl.² .......................................... B60B 27/06
[52] U.S. Cl. ................................ 301/105 R; 29/159.3
[58] Field of Search ................................ 301/59–60, 301/105 R, 105 B, 74, 80, 106–107; 29/159.3; 113/116 D

[56] References Cited

U.S. PATENT DOCUMENTS

| 510,519 | 12/1893 | Rahouct | 29/159.3 |
| 1,452,200 | 4/1923 | Hecht | 29/159.3 |
| 2,267,126 | 12/1941 | Moretti | 113/116 D |
| 2,702,717 | 2/1955 | Cornelius | 301/105 R |
| 3,008,630 | 11/1961 | Storrs | 113/116 D X |
| 3,909,067 | 9/1975 | Nichols | 301/104 |

Primary Examiner—Allen N. Knowles
Attorney, Agent, or Firm—Kolisch, Hartwell, Dickinson & Stuart

[57] ABSTRACT

A wheel hub plate pressed from flat metal stock having over a significant portion thereof a region of compound curvature generated by a pressing step. Cutouts prepared in the metal stock accommodate the enlargement which occurs when shaping the region of compound curvature. The cutouts are distributed in the region of compound curvature, and are located where such region joins with end tabs in the hub plate.

7 Claims, 4 Drawing Figures

CURVED METAL CLAMP PLATE

This invention related to the manufacture of a curved metal plate, and more particularly to the manufacture of such a plate which possesses a curvature when viewing the plate in a side elevation and also when viewing the plate in a transverse cross-section, so as to have what is referred to herein a region of compound curvature.

The plate specifically contemplated and described herein comprises a wheel hub plate of generally semi-cylindrical profile when viewed in side elevation, and constructed so that when a pair of such plates are secured in opposing relation about the outside of a central axle part, they provide a mounting for the inner ends of spokes radiating outwardly in the wheel.

A wheel hub plate of the type described conventionally may be manufactured utilizing a die and pressing the shape desired into a metal blank which previously has been cut to proper dimensions from a ribbon of metal stock. When shaping the metal blank, tearing tends to appear at stress regions produced, which has created problems, including precluding introducing spoke holes before the shaping. Cutting of the metal blanks used in making the plates has been performed in such a manner as to result in the production of a considerable amount of scrap. Because of the configuration which is pressed into the plate, it is difficult to obtain the exact configuration desired in the curved regions thereof, and this impairs the clamping contact of the finished article. Ordinary procedures have involved a number of handling steps in converting the metal stock into the final product, which has tended to be reflected in high cost of manufacture.

This invention contemplates a wheel hub plate, and a method for making it, which eliminates or at least substantially minimizes many of the problems indicated above. The plates may be prepared from a ribbon of stock material using a progressive die in a stamping press with minimal handling of the material.

The general object of the invention, therefore, is to provide an improved wheel hub plate pressed from flat metal stock where the plate includes a region of compound curvature throughout a significant expanse thereof, and characterized by cutouts in said region which facilitate the proper shaping of the plate with minimizing of high-stress regions.

Another object of the invention is to provide a novel method for manufacturing a plate which includes a region of compound curvature throughout a significant expanse thereof.

Yet a further object is to provide a plate of the general description indicated, which lends itself to being prepared from a ribbon of material with minimal waste and handling during the cutting and shaping.

These and other objects and advantages are attained by the invention, which is described hereinbelow in conjunction with the accompanying drawings, wherein.

Figure 1:
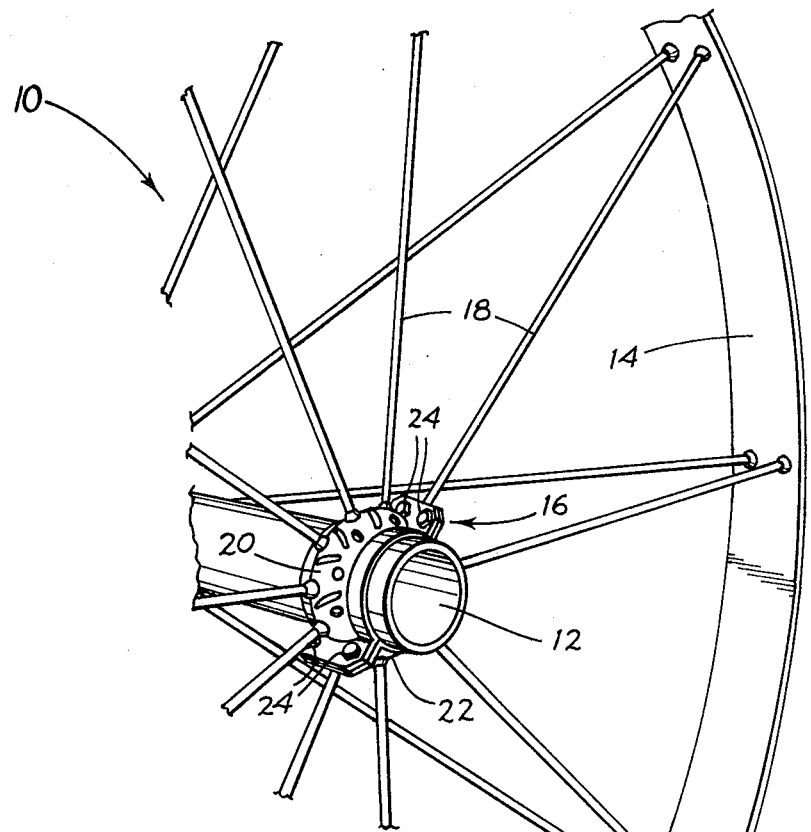
FIG. 1 is a view illustrating portions of a wheel including wheel hub plates as contemplated herein secured to an axle and mounting the inner extremities of radiating spokes.

Referring now to the drawings, and first of all more particularly to FIG. 1, indicated generally at 10 is a portion of a wheel exemplary of the type that may be constructed incorporating the wheel hub plate of the instant invention. The wheel typifies a wheel such as might be employed in an irrigation line, either as part of a mover in the line or as means for supporting the pipe in the line. The wheel includes a pipe forming an axle 12, an outer rim 14, a hub 16 secured to the axle 12, and spokes 18 radiating out from the hub to points of joinder with the rim.

Hub 14 comprises a pair of hub plates 20, 22 secured together in opposing relation about the axle by fasteners 24. The hub plates may be identical in construction, and one is illustrated in greater detail in FIGS. 2 and 3.

Referring to these figures, and hub plate 20 shown, the plate, as will be described, is pressed from flat metal stock.

Figure 3:
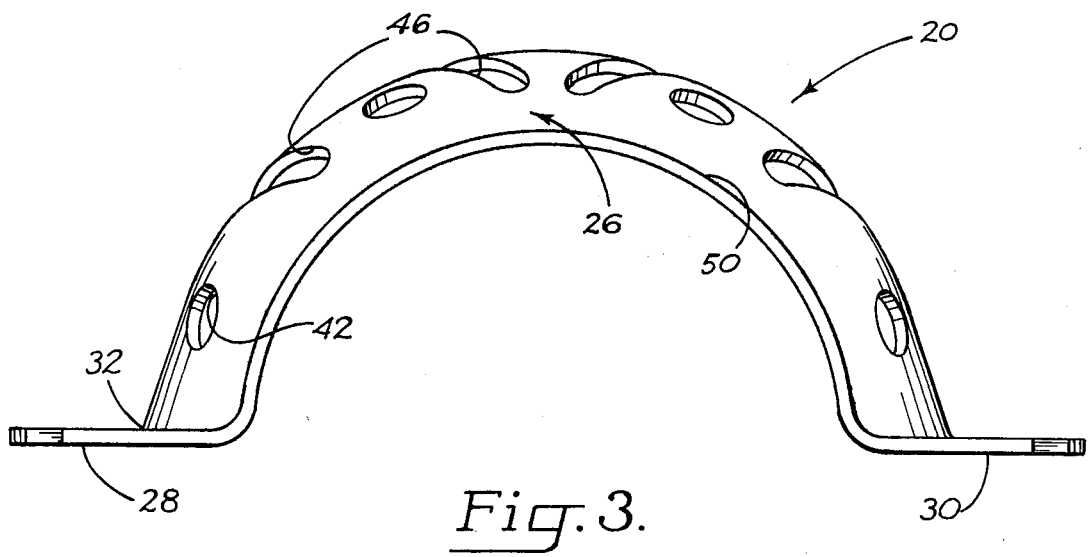

In side elevation as illustrated in FIG. 3, the plate has a substantially semi-cylindrical profile. More particularly, the plate includes throughout most of its expanse a region of compound curvature 26 possessing a semi-cylindrical or arcuate outline in side elevation and in addition, a curved or arcuate outline in transverse cross-section.

The hub plate at opposite extremities of the region of compound curvature includes end tabs 28, 30. Each tab as exemplified by tab 28, is integrally joined with the remainder of the hub plate. The tab extends outwardly from the region of compound curvature at a bend 32 which is reversely curved from the curved outline possessed by region 26 viewed in side elevation. The tabs 28, 30 occupy a common plane. Holes or apertures 34, 36 in these tabs provide means for receiving the fasteners 24 which secure opposing hub plates to the axle in the wheel.

Figure 2:
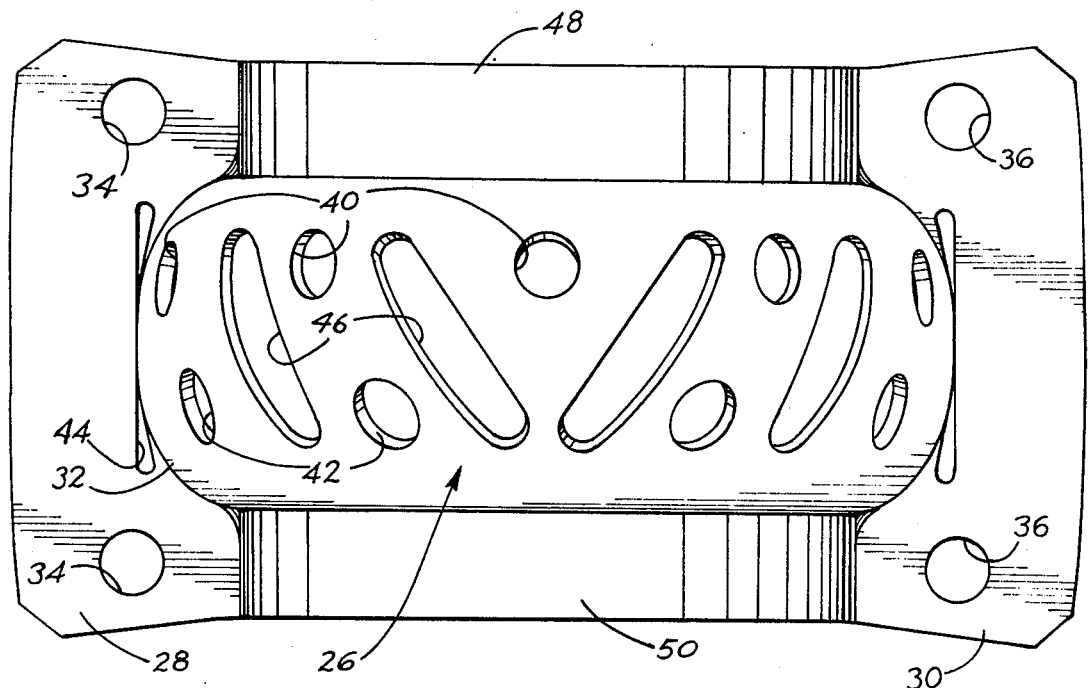
FIGS. 2 and 3 are views on a slightly enlarged scale, illustrating in plan and in side elevation, a wheel hub plate as constructed according to the invention.

It will be noted that region 26 incudes, along one side thereof, or the upper side as shown in FIG. 2, five holes or apertures 40, disposed substantially in a row and distributed substantially equidistantly along the length of region 26. Along the opposite side of the region are illustrated four holes or apertures 42, also aligned substantially in a row and spaced substantially equidistantly from each other. The wheel shown in FIG. 1 includes, over one-half the circumference of the wheel, five spokes 18. In making such a wheel, the holes 40 are employed for the anchoring of the inner ends of the spokes. The spokes are made with enlarged ends which fit within the hub plate, in the space bounded by the outside of the axle and the inner surface of region 26. Shank portions of the spokes protrude through the holes and extend to joinder with the rim.

In making a wheel with a lesser number of spokes, it should be obvious that the holes 42 may be employed to provide in the complete wheel a total of eight spokes. The same hub plate, therefore, may be utilized in manufacturing either 8 or 10 spoke wheels, and obviously by changing the number of holes and their organization, a different spoke arrangement is possible.

Referring again to FIG. 2, it will be noted that adjacent the bend where each tab joins with the region of compound curvature, a cutout 44 is provided such takes the form of an elongate slot cut out of the metal which substantially parallels the bend where tab extends outwardly from region 26. These slots permit the end of the region of compound curvature during the shaping process to be located substantially in the plane of the tabs, without such shaping introducing a highly stressed region which would result in tearing, etc.

It will be further noted that interspersed with the various holes in the compoundly curved region, elongate cutouts or slots 46 are provided. These are generally oriented with their axes disposed at an oblique angle relative to the longitudinal axis of the compoundly curved region. The slots, it will be noted, are somewhat wider at their mid-regions than at the ends, which, as will be described, is the result of distortion produced in the cutouts during the shaping of the plate, the distortion accommodating the enlargement which occurs in region 26 by generating in the region the compound curvature.

The wheel hub plate shown in FIGS. 2 and 3 in addition to the tabs 28, 30 includes band portions 48, 50 extending along each side of region 26. These band portions while curved in outline viewing a side elevation of the plate, are substantially flat in a transverse cross-section. The band portions with the hub in place on the axle contact the axle firmly when such are drawn together by tightening fasteners 24.

As has been discussed briefly earlier, the hub plate may be prepared from flat metal stock, in the form of a ribbon of metal, with what forms a plate comprising an elongate portion cut from the ribbon of material with the axis of this portion extending transversely of the ribbon. In the manufacture of an elongate ribbon of metal, it is expected that the grain, so to speak, of the metal will extend longitudinally of the ribbon. As a consequence, such grain in the final hub plate will extend transversely of the longitudinal axis of the plate, or approximately vertically viewing the plate as shown in FIG. 2. Cutouts 46 accommodate the enlargement which occurs when a compound curvature is generated, and minimize introduction of high-stress regions, which would be particularly troublesome in metal parts with grain oriented as described.

Figure 4:
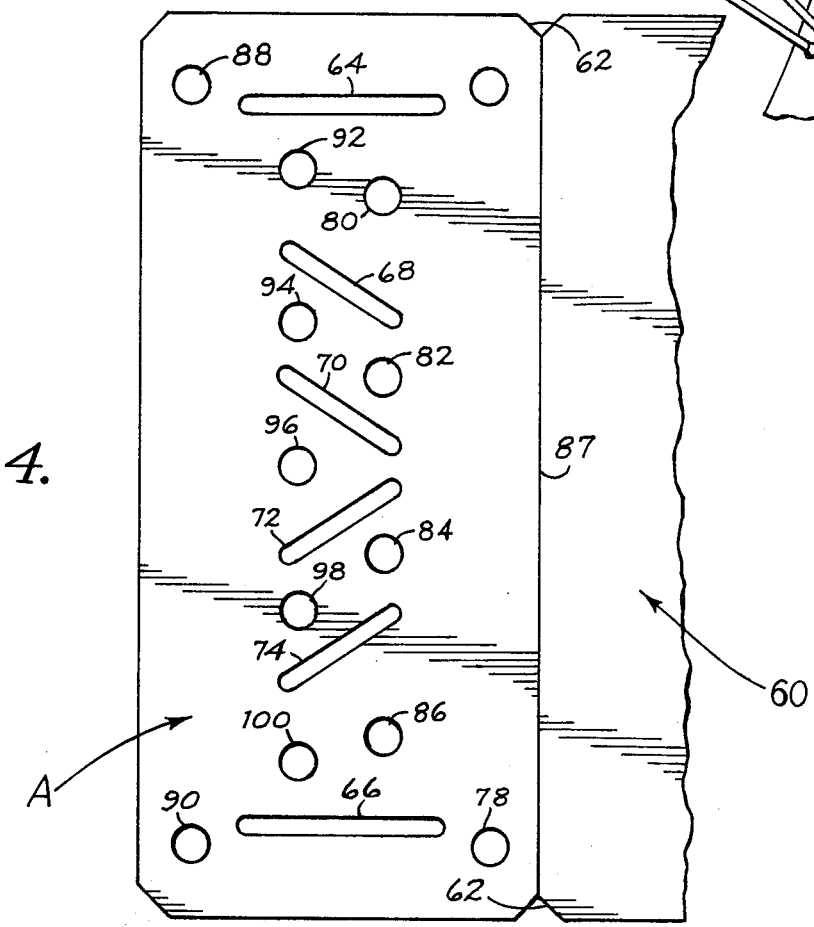
FIG. 4 is a view on a somewhat reduced scale illustrating steps in the process of making a hub plate from a ribbon of metal stock.

In manufacturing the wheel hub plate, and referring to FIG. 4, a so-called "progressive die" may be employed, operated by a stamping press, which is operable, on a ribbon of stock material being fed through the die, at different stations therein to produce cutting and shaping.

Explaining this manufacture, and referring to FIG. 4, the ribbon of stock material from which the hub plate is repaired is indicated generally at 60. While such is shown broken off in the figure, it should be understood that the ribbon is an elongate piece, and the grain of the metal in the material which extends longitudinally of this ribbon, extends in a horizontal direction as the ribbon is illustrated in FIG. 4.

In a typical manufacture, and at the first station in the progressive die, the notches 62 may be cut out of the material together with slots 64, 66, 68, 70, 72, and 74.

At the next station, the holes 76, 78, and those shown at 80, 82, 84, and 86 may be cut from the stock. Additionally, part line 87 may be cut, which nearly but not completely severs portion A from ribbon 60. At the next station, the remainder of the holes shown, i.e. holes 88, 90, 92, 94, 96, 98, 100 may be cut. In the final station of the progressive die, portion A bounded by cut line 87 is finally separated from the remainder of the ribbon of stock material, and the severed piece is shaped to the configuration shown in FIGS. 2 and 3.

In the shaping, the slots 64, 66 are deformed with contraction occurring, to produce in the hub plate apertures or cutouts 44 already described. Similarly, slot 68, 70, 72, 74 are deformed, but in this instance with enlargement occurring, to produce the cutouts 46 already described.

It will be noted that with the process a blank as such need not be first prepared, with shaping steps subsequently performed on this blank. Handling of the material during the production of the hub plate is minimized. Shaping is performed without the introduction of severely highly stressed regions tending to produce tearing and weakening. The process permits the manufacture of a plate with the grain in the metal extending as described, which is transversely of the longitudinal axis of the plate. Trimming waste is insignificant, such being limited to the amount of material removed in making the notches 62, and the various holes and slots described.

In the wheel hub plate and the method of making it, the holes which accommodate the spokes are cut into the metal stock which forms the plate prior to the shaping to generate the region of compound curvature 26. With the cutouts described interspersed with these holes also cut in the stock before the shaping of the plate, after shaping there is minimal distortion of the holes and no evidence of tearing at the holes. The cutouts, in effect, make it possible to cut the holes in the plate prior to the shaping, eliminating the handling step which would be required were the plate first to be shaped in a die and subsequently processed to have the spoke holes prepared therein.

It is appreciated that variations and modifications are possible, as would be apparent to one skilled in the art.

What is claimed is:

1. A wheel hub plate pressed from flat metal stock, the plate having a curved outline when viewed in side elevation and also possessing a curved outline in transverse cross-section so as to have throughout a significant portion thereof a region of compound curvature,
    apertures in said region of compound curvature for the mounting of spokes in the wheel, and
    multiple elongate cutouts in the plate in the region thereof of compound curvature, distributed over such region and interspersed with said apertures, said cutouts having their axes disposed at an oblique angle relative to the longitudinal axis of the region of compound curvature, said cutouts accommodating, with distortion of the areas encompassed by said cutouts, the shaping which occurs in the flat metal stock when such is pressed to form the hub plate with the generation of compound curvature in said region of compound curvature.

2. The wheel hub plate of claim 1, which further includes as an integral part of the plate end tabs at extremities of said region of compound curvature, each tab extending outwardly from the region of compound curvature at a bend which is reversely curved from the curved outline possessed by said region in side elevation, said plate having cutouts adjacent said bends, the cutouts adjacent said bends having been contracted and the cutouts in said region of compound curvature having been expanded when the metal stock is pressed to form the hub plate.

3. The wheel hub plate of claim 1, which further includes, extending along each side of said region of compound curvature, a band portion which has a curved outline when the plate is viewed in side elevation, but which are substantially flat in a transverse cross-section of the plate, and said band portions are devoid of cutouts.

4. The wheel hub plate of claim 2, wherein the cutouts adjacent said bends are elongate slots substantially paralleling the bends.

5. A wheel hub plate pressed from flat metal stock, the plate having a curved outline when viewed in side elevation and also possessing a curved outline in transverse cross-section so as to have throughout a significant portion thereof a region of compound curvature, apertures in said region of compound curvature for the mounting of spokes in a wheel, multiple cutouts in the plate in the region thereof of compound curvature distributed over such region and interspersed with said apertures, accommodating, with distortion of the areas encompassed by said cutouts, the shaping which occurs in the metal stock when such is pressed to form the hub plate with the generation of compound curvature in said region of compound curvature, said clamp further including as an integral part thereof end tabs at extremities of said region of compound curvature, each extending outwardly from the region of compound curvature at a bend which is reversely curved from the curved outline possessed by said region in side elevation, cutouts in said plate adjacent said bends which are elongate slots substantially paralleling the bends, the cutouts adjacent said bends having been contracted and the cutouts in said region of compound curvature having been expanded by the shaping which occurs in the metal stock when such is pressed to form the hub plate.

6. A wheel hub plate pressed from flat metal stock, the plate having a curved outline when viewed in side elevation and also possessing a curved outline in transverse cross section so as to have throughout a significant portion thereof a region of compound curvature, said wheel hub plate further including end tabs at extremities of said region of compound curvature forming the ends of the hub plate, each tab extending outwardly from said region at a bend which is reversely curved from the curved outline possessed by said region in side elevation, and a cutout in said plate adjacent the bend where an end tab extends outwardly from said region of compound curvature effective at the location of the bend to free the region of compound curvature from the tab.

7. A wheel hub plate as claimed in claim 6, which further comprises a pair of elongate band portions, one extending along each side of the region of compound curvature, each band portion having a curved outline when the plate is viewed in side elevation but being substantially flat in a transverse direction, each band portion meeting with said end tabs at opposite ends of the hub plate with portions of said end tabs being continuations of the band portion, and apertures in said portions of said end tabs for receiving fasteners mounting the hub plate.

* * * * *